Patented June 5, 1951

2,555,912

UNITED STATES PATENT OFFICE 2,555,912

CYCLOHEXYL-SUBSTITUTED ALPHA,-OMEGA GLYCOLS AND PROCESS FOR PREPARING THEM

Harold W. Arnold, Claymont, Del., assignor to E. I. du Pont de Nemours & Company, Wilmington, Del., a corporation of Delaware No Drawing. Application August 18, 1948, Serial No. 44,992

10 Claims. (Cl. 260—617)

This invention relates to alpha,omega glycols and more particularly to cycloaliphatic-substituted alpha,omega glycols and to methods for their preparation.

Cycloaliphatic-substituted glycols have in the past been available only through long, arduous and expensive syntheses. Thus, J. von Braun, Ber. 56, 2178 (1923), described the preparation of cyclohexylethylene glycol in a seven-step synthesis starting from cyclohexylacetic acid, which itself is not a readily available, nor easily prepared compound. Attempts to prepare the cycloaliphatic-substituted glycols from the corresponding aryl-substituted glycols by hydrogenation with certain noble metal catalysts under conditions known in the art for hydrogenation of aromatic rings led only to dehydroxylation, i. e., replacement with hydrogen of the hydroxyl on the carbon atom carrying the aromatic ring. For example, Baltzly and Buck, J. Am. Chem. Soc., 65, 1984 (1943), using palladium-on-charcoal catalyst under aromatic ring hydrogenation conditions, report the preparation of alpha-hydroxy-beta-phenylethane (i. e., beta-phenylethyl alcohol) from alpha-beta-dihydroxy-beta-phenylethane (i. e., phenylethylene glycol) with the production of no detectable quantities of cyclohexylethylene glycol. Similar results for other aryl-substituted glycols have been obtained, as will be described later, with base metal hydrogenation catalysts using conditions known in the art for hydrogenation of aromatic rings with these type catalysts.

It is an object of this invention to provide new cycloaliphatic-substituted alpha,omega glycols and methods for their preparation. A further object is to provide new cyclohexyl-substituted alpha,omega glycols having superior thermal stability over long periods of time. A still further object is to prepare cyclohexyl-substituted alpha,-omega glycols from the corresponding phenyl-substituted alpha,omega glycols. Another object is to provide a process for selectively hydrogenating the phenyl substituent in an alpha,-omega glycol to a cyclohexyl substituent without at the same time replacing with hydrogen the hydroxyl on the carbon atom bearing the benzene ring. Other objects will appear hereinafter.

The objects of this invention are accomplished by hydrogenating at relatively low temperatures in the presence of a ruthenium catalyst a phenyl-substituted alpha,omega glycol carrying a phenyl substituent on the alpha carbon. It has now been discovered that alpha,omega glycols carrying a cyclohexyl residue on the alpha-carbon can thus be prepared. This invention includes as new compounds the alpha,omega-glycols containing a contiguous chain of from three to eleven carbon atoms joining the hydroxyls, said chain carrying from one to five cyclohexyl rings on alternate carbon atoms, one of which cyclohexyl rings is on a carbon atom immediately joined to one of the hydroxyl groups.

The method of this invention can be carried out by hydrogenating at a temperature of 50° to 150° C. under a pressure in excess of 100 lbs./sq. in. and in the persence of a ruthenium catalyst an alpha-phenyl-alpha,omega-alkylene glycol, such as 1-phenyl-1,3-propanediol. It is preferable to use an organic solvent, such as ethanol. The preferred phenyl-substituted glycols for use in this invention are alpha-phenyl-alpha,omega-alkylene glycols containing a contiguous chain of not more than eleven carbon atoms joining the hydroxyls and from one to five phenyl substituents on alternate carbon atoms of said chain. The preferred new compounds of this invention are alpha-cyclohexyl-alpha,omega-alkylene glycols containing a contiguous chain of from three to eleven carbon atoms joining the hydroxyls and from one to five cyclohexyl rings on alternate carbon atoms of said chain. These new compounds are represented by the general formula

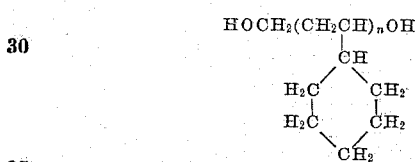

where $n$ is an integer from one to five.

The following examples, in which the parts given are by weight, further illustrate the invention.

EXAMPLE I

In a stainless steel reactor equipped for operation under high pressure is placed 100 parts of 1-phenyl-1,3-propanediol ($n_D^{25}$, 1.5440), 39 parts of 95% ethanol and 2 parts of ruthenium dioxide. The reactor is closed and pressured to 1,000–2,000 lb./sq. in. pressure with hydrogen. The reactor is heated until an internal temperature of 100° C. is reached and this temperature is held for 2 hours with agitation. At the end of this time the reactor is cooled to room temperature, excess pressure is vented to the atmosphere, the contents are removed, and the catalyst is separated by filtration. The alcohol is removed from the filtrate by distillation, and the resulting residue is purified by fractional distillation through a precision still under reduced pressure. There is thus obtained 87 parts of 1-cyclohexyl-1,3-propanediol, a clear, colorless, slightly viscous oil boiling at 137–140° C. under a pressure of 2.5 mm. of mercury ($n_D^{25}$, 1.4850). Treatment with phenyl isocyanate gives a crystalline bisphenyl urethane melting at 115–116° C. after recrystallization from benzene-petroleum ether.

Anal.: Calc'd. for $C_{23}H_{28}N_2O_4$: N, 7.1%;
Found: N, 7.46%.

The superior thermal stability of 1-cyclohexyl-1,3-propanediol, as contrasted to 1-phenyl-1,3-propanediol, is well illustrated by the fact that samples of the former indicated no change in color or in viscosity after being heated in sealed glass vessels for a 24-hour period at a temperature of 260° C., whereas samples of the latter heated under the same conditions became quite dark and indicated a large decrease in viscosity.

EXAMPLE II

A. *Preparation of 1,3-diphenyl-1,5-pentanediol*

To a solution of 60 parts of formaldehyde (introduced as para-formaldehyde) and 68 parts of boron trifluoride in 734.3 parts of acetic acid is added 520 parts of styrene over a period of one minute while the reactor is cooled in an ice bath. An exothermic reaction occurs raising the temperature of the mixture from 25° C. to 40° C. The clear solution which results is held at room temperature for three days. The reaction is terminated by adding ice and 160 parts of sodium hydroxide dissolved in 160 parts of water. The oily organic product is separated, washed with water, dried over anhydrous calcium sulfate and distilled through a 19″ Vigreux column under reduced pressure. The following fractions are obtained:

| Number | Boiling Point | Weight | Refractive Index ($n_D^{25}$) |
|---|---|---|---|
| 1 | 42° C./16 mm | 16.7 | 1.5409 |
| 2 | 48–96° C./16 mm | 9.0 | 1.5219 |
| 3 | 104° C./16 mm.–117° C./2.8 mm | 24.5 | 1.4971 |
| 4 | 114–141° C./2.8 mm | 21.7 | 1.5025 |
| 5 | 143° C./2.8 mm | 28.0 | 1.4969 |
| 6 | 143° C./2.8 mm | 24.9 | 1.4959 |
| 7 | 143–144° C./2.8 mm | 16.9 | 1.4955 |
| 8 | 116° C./0.6 mm | 24.7 | 1.4978 |
| 9 | 117° C./0.6 mm | 22.2 | 1.4993 |
| 10 | 121–122° C./0.6 mm | 23.3 | 1.5018 |
| 11 | 122–140° C./0.6 mm | 22.1 | 1.5180 |
| 12 | 141–146° C./0.6 mm | 10.2 | 1.5289 |
| 13 | 157–168° C./0.6 mm | 26.3 | 1.5475 |
| 14 | 177–184° C./0.6 mm | 23.6 | 1.5421 |
| 15 | 183–188° C./0.6 mm | 21.4 | 1.5341 |
| 16 | 193–196° C./0.8 mm | 16.7 | 1.5349 |
| 17 | Still residue | 285.4 | |

Fraction 1 represents recovered styrene and Fraction 2 last traces of recovered styrene and early foreshots of product. The weights of Fractions 3 through 17 inclusive total 591.9 parts. Fraction 15 is indicated by analysis to be principally the diacetate of 1,3-diphenyl-1,5-pentanediol.

Anal.: Calc'd. for

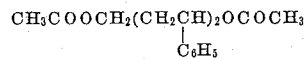

C, 74.09%; H, 7.11%; hydroxyl number, 0.
Found: C, 75.15%; H, 7.19%; hydroxyl number, 3.3.

Fraction 17 is indicated by analysis to be a mixture of glycol diacetates averaging approximately 5 styrene units per molecule.

Anal.: Calc'd. for

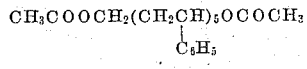

Saponification equivalent 326.4; molecular weight 652.8; C, 82.79%; H, 7.41%.
Found: Saponification equivalent 320.6; molecular weight 636; C, 81.35%; H, 7.45%.

Portions of Fractions 15 and 16 totalling 18.3 parts are combined and saponified by refluxing in a solution of 40 parts of sodium hydroxide in a mixture of 40 parts of water and 100 parts of alcohol. The glycol so obtained is extracted with 100 parts of toluene, the toluene distilled off, and the glycol purified by distillation. There is thus obtained 12 parts of 1,3-diphenyl-1,5-pentanediol as a clear, highly viscous liquid boiling at 200° C. under 0.5 mm. of mercury pressure.

Anal.: Calc'd. for

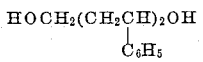

C, 79.65%; H, 7.87%.
Found: C, 79.64%; H, 8.00%.

B. *Preparation of 1,3-dicyclohexyl-1,5-pentanediol*

A solution of 5.8 parts of the above 1,3-diphenyl-1,5-pentanediol in 39.45 parts of absolute ethanol is shaken at 100–110° C. with two parts of ruthenium dioxide catalyst for three hours under a hydrogen pressure of 2,000 lb./sq. in. in a high pressure reactor. The reactor is allowed to cool to room temperature, excess pressure vented to the atmosphere and the contents removed. The catalyst is separated from the reaction mixture by filtration, the solvent is distilled off under reduced pressure, and the product is purified by vacuum distillation through a Vigreux column. There is thus obtained 4.0 parts of 1,3-dicyclohexyl-1,5-pentanediol as a highly viscous, colorless liquid boiling at 178–192° C. under one mm. of mercury pressure, $n_D^{25}$, 1.4988.

Anal.: Calc'd. for $C_{17}H_{32}O_2$: C, 76.20%; H, 11.92%
Found: C, 76.84%; H, 12.12%

As a further illustration of the process of this invention, phenylethylene glycol is smoothly hydrogenated, in ethanol in the presence of ruthenium dioxide catalyst at 100–120° C. over a period of five hours under a pressure of 2000–2500 lb./sq. in. of hydrogen, to cyclohexylethylene glycol in 87% yield. As has previously been indicated herein, the prior hydrogenation art as taught by Baltzly and Buck [J. Am. Chem. Soc. 65, 1984 (1943)] indicates that phenylethylene glycol when hydrogenated under normally accepted aromatic ring hydrogenation conditions is converted solely to beta-phenylethyl alcohol, i. e., dehydroxylation occurs removing the hydroxyl group on the carbon atom carrying the phenyl group.

The effect of other hydrogenation catalysts and conditions, normally used for the hydrogenation of aromatic rings, in the attempted preparation of the selected cycloaliphatic-substituted glycols of this invention is well illustrated by the following experiment:

In a stainless steel reactor fitted for operations under high pressure is placed 150 parts of 1- phenyl-1,3-propanediol and 15 parts of nickel-on-kieselguhr catalyst. The reactor is closed, pressured to 2,500 lb./sq. in. with hydrogen, and is heated until an internal temperature of 180–190° C. is reached. This temperature is maintained for 3.5 hours with agitation. The reactor is then cooled to room temperature, excess pressure is vented to the atmosphere, the contents are removed, and the catalyst is separated by filtration. The filtrate is purified by fractionation through a precision still under reduced pressure. The main fraction thus obtained is 73.6 parts of 1-phenyl-3-hydroxypropane boiling at 88° C. under a pressure of 2.4 mm. of mercury ($n_D^{25}$, 1.5216).

Anal. Calc'd. for $C_9H_{12}O$: C, 79.4%; H, 8.83%; molecular weight 136.
Found: C, 78.1; H, 8.70; molecular weight, 148.

This compound gives a crystalline para-nitrobenzoate melting at 48° C. The melting point of the para-nitrobenzoate of 1-phenyl-3-hydroxypropane is 45–46° C., as reported in Heilbron's "Dictionary of Organic Compounds," vol. II, p. 209, Eyre and Spottiswoode, 1936.

Anal.: Calc'd. for $C_{16}H_{15}O_4N$; C, 67.4%; H, 5.27%; N, 4.92%
Found: C, 66.98%; H, 5.38%; N, 5.15%

Thus, since the main product obtained from the hydrogenation of 1-phenyl-1,3-propanediol in the presence of a catalyst (nickel-on-kieselguhr) and under reaction conditions normally used for the hydrogenation of an aromatic ring is 1-phenyl-3-hydroxypropane, it is evident that under these conditions dehydroxylation occurs, and the benzyl hydroxyl is removed, that is the hydroxyl group on the carbon atom carrying the phenyl group is removed and replaced by hydrogen. However, as has already been demonstrated using ruthenium catalysts and the milder conditions of the process of this invention, a smooth conversion to 1-cyclohexyl-1,3-propanediol of high purity in good yields is readily obtained.

Although in the above given examples there have been used certain definite conditions of temperature and pressure, concentration, duration of reaction, etc., it is to be understood that these values may be varied somewhat within the scope of the invention since the optimum conditions for carrying out the process are determined by the particular compound being treated.

In general, the process of this invention is operable at temperatures from 50° C. to 150° C. and preferably in the range of 80 to 120° C.

Although the process is operable at atmospheric pressure, generally pressures in excess of 100 lb./sq. in., are used since under such conditions a practicable rate of reaction is obtained. The upper pressure limit is determined by the structural limitations of the equipment employed.

The process may be carried out in the absence of a solvent, but it is generally operated in the presence of an organic solvent, non-reactive with the starting phenyl-substituted glycols, the end-product cyclohexyl-substituted glycols, and hydrogen. Such solvents include alcohols, ethers and hydrocarbons. Examples of specific organic solvents that may be used as reaction media in the process of this invention are methanol, ethanol, propanol, isopropanol, dioxane, cyclohexane, and the like.

The proportion of catalysts employed may be varied considerably. In general, an amount of catalyst is used that will bring about a reaction at a suitable rate. Usually the amount will vary from 0.1 to 10% by weight of the phenyl-substituted glycol being reduced, although higher amounts may be used. When it is desired to effect reduction at a rapid rate and at a relatively low temperature, it is advisable to use a catalyst concentration in the range of 1 to 5% by weight, although amounts in the range 30 to 50% can be used. On the other hand if catalyst economy is desired, then it is well to extend the catalyst on a support such as charcoal and to use an amount of catalyst in the range of 0.01 to 1.0% by weight. Under such conditions higher temperatures are required to effect the reduction at a reasonable rate, i. e., as the amount of catalyst decreases the temperature required to attain a practicable rate of reaction increases.

The catalysts of this invention comprise finely divided ruthenium either in the form of the free metal or in the form of its oxides or salts. It has been found that a commercial grade of ruthenium oxide is satisfactory. The catalyst may also be supported on a carrier such as charcoal, silica gel, alumina, etc. A suitable method for preparing, for example, charcoal-supported catalyst consists of fusing ruthenium or its oxide with sodium peroxide, dissolving the salt, pouring the resulting solution over charcoal and drying the impregnated charcoal. Other methods, however, can be used such as that of U. S. Patent No. 2,079,404, or other procedures based on the reduction of a compound of ruthenium in the presence of a carrier substance.

The process of this invention provides a simple method for producing at low temperatures in good yields and high conversions, alpha,omega-glycols carrying a cyclohexyl radical on the alpha-carbon atom from the corresponding phenyl-substituted glycols. These cyclohexyl glycols as a class are outstanding among the known glycols for their high thermal insensitivity, i. e., ability to withstand high temperatures for long periods of time without exhibiting the thermal decomposition that other known glycols do. Thus by the process of this invention, the cyclohexyl-substituted alpha,omega glycols are made available at low cost by a convenient, easily operable method.

These new cyclohexyl-substituted glycols may be used as polyester intermediates, plasticizers, hydraulic fluid components, insect repellents, perfume ingredients, dust collecting aids and as intermediates in the syntheses of other useful organic compounds. In such uses as plasticizers, hydraulic fluid components and dust collecting aids, cyclohexyl-substituted glycols of the following formula are preferred

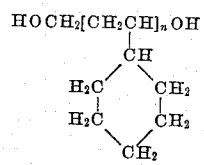

where $n$ is an integer from 2 to 5.

As many apparently widely different embodiments of this invention may be made without departing from the spirit and scope thereof, it is to be understood that this invention is not limited to the specific embodiments thereof except as defined in the appended claims.

I claim:
1. A method of preparing 1-cyclohexyl-1,3- propanediol which comprises hydrogenating 1-phenyl-1,3-propanediol at a temperature between 50° and 150° C. under a pressure in excess of 100 lb./sq. in. and in the presence of a ruthenium catalyst.

2. A method of preparing 1,3-dicyclohexyl-1,5-pentanediol which comprises hydrogenating 1,3-diphenyl-1,5-pentanediol at a temperature between 50° and 150° C. under a pressure in excess of 100 lb./sq. in. and in the presence of a ruthenium catalyst.

3. The chemical compound, 1-cyclohexyl-1,3-propanediol.

4. The chemical compound, 1,3-dicyclohexyl-1,5-pentanediol.

5. A method of preparing a cyclohexyl-substituted alpha,omega-glycol carrying an unsubstituted cyclohexyl substituent on the alpha carbon which comprises hydrogenating at a temperature between 50° and 150° C. under a pressure in excess of 100 lbs./sq. in. and in the presence of a ruthenium catalyst a phenyl-substituted alpha,omega-glycol carrying a phenyl substitutent on the alpha carbon.

6. A method of preparing an alpha-cyclohexyl-alpha,omega-alkylene glycol having two terminal hydroxyl groups and in a contiguous chain therebetween an odd number of from three to eleven carbon atoms attached solely to hydrogen atoms and to from one to five unsubstituted cyclohexyl groups each of which is attached to an alternate carbon atom of said chain with one of said cyclohexyl groups being attached to the same carbon atom as a terminal hydroxyl group, which comprises hydrogenating at a temperature between 50° and 150° C. under a pressure in excess of 100 lbs./sq. in. and in the presence of a ruthenium catalyst an alpha-phenyl-alpha,omega-alkylene glycol having two terminal hydroxyl groups and in a contiguous chain therebetween an odd number of from three to eleven carbon atoms attached solely to hydrogen atoms and to from one to five phenyl groups each of which is attached to an alternate carbon atom of said chain with one of said phenyl groups being attached to the same carbon atom as a terminal hydroxyl group.

7. The method set forth in claim 6 wherein said temperature is between 80° and 120° C.

8. The method set forth in claim 6 wherein said ruthenium catalyst is ruthenium dioxide.

9. A method of preparing an alpha-cyclohexyl-alpha,omega-alkylene glycol having the general formula

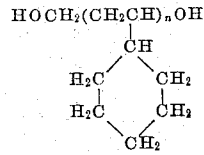

wherein $n$ is an integer from one to five which comprises hydrogenating at a temperature between 50° and 150° C. under a pressure in excess of 100 lbs./sq. in. and in the presence of a ruthenium catalyst an alpha-phenyl-alpha,omega-alkylene glycol having the general formula

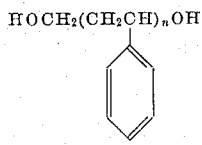

wherein $n$ is an integer from one to five.

10. An alpha-cyclohexyl-alpha,omega-alkylene glycol having the general formula

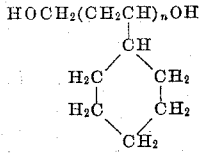

wherein $n$ is an integer selected from the group consisting of one to five.

HAROLD W. ARNOLD.

REFERENCES CITED

The following references are of record in the file of this patent:

UNITED STATES PATENTS

| Number | Name | Date |
|---|---|---|
| 2,449,956 | Shokal et al. | Sept. 21, 1948 |

OTHER REFERENCES

Ellis: "Hydrogenation of Organic Substances," D. Van Nostrand, New York (1930), page 87 (1 page only).